US009479302B2

(12) United States Patent
Nakao et al.

(10) Patent No.: US 9,479,302 B2
(45) Date of Patent: *Oct. 25, 2016

(54) RADIO TERMINAL, RADIO BASE STATION, CHANNEL SIGNAL FORMING METHOD, AND CHANNEL SIGNAL RECEIVING METHOD

(71) Applicant: Sun Patent Trust, New York, NY (US)

(72) Inventors: Seigo Nakao, Kanagawa (JP); Akihiko Nishio, Osaka (JP); Daichi Imamura, Beijing (CN)

(73) Assignee: Sun Patent Trust, New York, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 14/166,555

(22) Filed: Jan. 28, 2014

(65) Prior Publication Data
US 2014/0185555 A1     Jul. 3, 2014

Related U.S. Application Data

(63) Continuation of application No. 13/255,474, filed as application No. PCT/JP2010/001749 on Mar. 11, 2010, now Pat. No. 8,675,626.

(30) Foreign Application Priority Data

Mar. 12, 2009    (JP) ................................ 2009-059501

(51) Int. Cl.
| | |
|---|---|
| *H04W 4/00* | (2009.01) |
| *H04L 5/00* | (2006.01) |
| *H04L 1/00* | (2006.01) |
| *H04W 28/06* | (2009.01) |
| *H04J 3/16* | (2006.01) |

(Continued)

(52) U.S. Cl.
CPC ............ *H04L 5/0044* (2013.01); *H04L 1/0027* (2013.01); *H04L 5/001* (2013.01); *H04L 5/0007* (2013.01); *H04W 28/06* (2013.01); *H04W 72/042* (2013.01); *H04L 5/0053* (2013.01); *H04L 27/2634* (2013.01); *H04L 27/2647* (2013.01); *H04W 72/0406* (2013.01)

(58) Field of Classification Search
None
See application file for complete search history.

(56) References Cited

PUBLICATIONS

3GPP TS 36.211 V8.5.0, 3rd Generation Partnership Project; Technical Specification Group Radio Access Network; Evolved Universal Terrestrial Radio Access (E-UTRA); Physical Channels and Modulation (Release 8), Dec. 2008, pp. 1-82.

(Continued)

*Primary Examiner* — Ayaz Sheikh
*Assistant Examiner* — Sori Aga
(74) *Attorney, Agent, or Firm* — Seed IP Law Group PLLC

(57) ABSTRACT

A base station communicates with a terminal, for which an uplink component carrier and downlink component carriers are configured. The base station adjusts a payload size of control information, transmitted in a downlink control channel, based on a basic payload size, and maps the control information onto a search space in at least one of the downlink component carriers. The basic payload size of the control information mapped onto a search space in a primary downlink component carrier is based on a number of information bits obtained from a bandwidth of the primary downlink component carrier, and on a number of information bits obtained from a bandwidth of the uplink component carrier. The basic payload size of the control information mapped onto a search space in a non-primary downlink component carrier is based on a number of information bits obtained from a bandwidth of the non-primary downlink component carrier.

20 Claims, 7 Drawing Sheets

(51) Int. Cl.
  *H04L 12/28* (2006.01)
  *H04L 27/26* (2006.01)
  *H04W 72/04* (2009.01)

(56) References Cited

PUBLICATIONS

3GPP TS 36.212 V8.5.0, 3rd Generation Partnership Project; Technical Specification Group Radio Access Network; Evolved Universal Terrestrial Radio Access (E-UTRA); Multiplexing and channel coding (Release 8), Dec. 2008, pp. 1-58.

3GPP TS 36.213 V8.5.0, 3rd Generation Partnership Project; Technical Specification Group Radio Access Network; Evolved Universal Terrestrial Radio Access (E-UTRA); Physical layer procedures (Release 8), Dec. 2008, pp. 1-74.

Huawei, "DL/UL Asymmetric Carrier aggregation," R1-083706, 3GPP TSG-RAN-WG1 Meeting #54bis, Prague, Czech Republic, Sep. 29-Oct. 3, 2008, 4 pages.

Qualcomm Europe, "Notion of Anchor Carrier in LTE-A," R1-090860, 3GPP TSG RAN WG1 #56, Athens, Greece, Feb. 9-13, 2009, pp. 1-5.

Panasonic, "PHICH Linkage for asymmetric carrier aggregation," R1-090683, 3GPP TSG RAN WG1 Meeting #56, Athens, Greece, Feb. 9-13, 2009, pp. 1-3.

International Search Report, mailed Jun. 1, 2010, for PCT/JP2010/001749, 2 pages.

RADIO TERMINAL, RADIO BASE STATION, CHANNEL SIGNAL FORMING METHOD, AND CHANNEL SIGNAL RECEIVING METHOD

TECHNICAL FIELD

The present invention relates to a radio terminal, radio base station, channel signal forming method and channel signal reception method.

BACKGROUND ART

In 3GPP LTE, OFDMA (Orthogonal Frequency Division Multiple Access) is employed as a downlink communication method. In a radio communication system adopting 3GPP LTE, a base station transmits a synchronizing signal (synchronization channel: SCH) and a broadcast signal (broadcast channel: BCH) using prescribed communication resources. A terminal first synchronizes with a base station by capturing the SCH. Then, the terminal acquires parameters that are specific to that base station (for example, a frequency bandwidth) by reading BCH information (see, for example, Non-patent Literature 1, 2 and 3).

Also, after acquiring base station-specific parameters, a terminal to support an LTE system (hereinafter "LTE terminal") sends a connection request to the base station, and, by this means, establishes communication with the base station. The base station transmits control information to the terminal with which communication has been established, by using a PDCCH (Physical Downlink Control CHannel) when necessary.

The terminal performs "blind detection" for a received PDCCH signal. That is, a PDCCH signal includes a CRC (Cyclic Redundancy Check) part, and, at a base station, this CRC part is masked by the terminal ID of the target terminal. Thus, until a terminal demasks the CRC part of a received PDCCH signal with the terminal's terminal ID, the terminal cannot decide whether or not the PDCCH signal is for that terminal. In this blind detection, if the result of demasking is that CRC calculation is OK, the PDCCH signal is decided to have been sent to the terminal.

Also, control information sent from a base station includes assignment control information including such as information about resources which a base station assigns to a terminal. A terminal needs to receive both downlink assignment control information and uplink assignment control information which have a plurality of formats. Although downlink assignment control information which a terminal should receive can be defined in a plurality of sizes depending on the transmission antenna control method and frequency assignment method at a base station, some of these downlink assignment control information formats (hereinafter simply referred to as "downlink assignment control information") and uplink assignment control information formats (hereinafter simply referred to as "uplink assignment control information") are transmitted using PDCCH signals having the same size. A PDCCH signal includes type information of assignment control information (for example, a 1 bit flag). Thus, even if the size of a PDCCH signal including downlink assignment control information and the size of a PDCCH signal including uplink assignment control information are the same, a terminal checks type information of assignment control information, and by this means can distinguish between downlink assignment control information and uplink assignment control information. The PDCCH format to transmit uplink assignment control information is PDCCH format 0, and the PDCCH format to transmit downlink assignment control information, transmitted in a PDCCH signal being the same size as uplink assignment control information, is PDCCH format 1A.

However, cases might occur where the information size of uplink assignment control information determined from the uplink bandwidth (that is, the number of bits required for transmission) and the information size of downlink assignment control information determined from the downlink bandwidth differ. To be more specific, if an uplink bandwidth is small, the information size of uplink assignment control information becomes small, and, if a downlink bandwidth is small, the information size of downlink assignment control information becomes small. If a difference of bandwidths results in a difference of information sizes like this, by adding zero information to the smaller assignment control information (that is, by performing zero-padding), the size of downlink assignment control information and the size of uplink assignment control information are made equal. By this means, whether the content is downlink assignment control information or uplink assignment control information, PDCCH signals have the same size.

The size adjustment of control information as mentioned above reduces the number of times of blind detection at a terminal on the reception side. However, when a downlink transmission bandwidth of a base station is wide, the base station transmits many PDCCH signals at once, so that the terminal cannot reduce enough the number of times of blind detection in its normal operation, and the increase of circuit scale of a terminal causes a problem.

Therefore, to further reduce the number of times of blind detection by a terminal, a terminal employs the method to limit a physical space where a terminal receives control information. Thus, each terminal is reported in advance the time and frequency space where control information for that terminal is likely to be included, and performs blind detection only in a terminal-specific space where control information for that terminal is likely to be included. This terminal-specific physical space is called "UE specific search space (UE SS)." This UE specific search space is associated with, for example, a terminal ID. Also, a time and frequency interleaving is employed to provide a nearly equal time diversity and frequency diversity effect in all UE specific search spaces.

Meanwhile, a PDCCH signal includes control information that is reported at once to a plurality of terminals (for example, scheduling information about downlink broadcast signals). To transmit this control information, a physical space that is common to all LTE terminals that should receive the target downlink broadcast signal, called "common search space (Common SS)," is prepared in a PDCCH signal. Even in this common search space, as in the UE specific search space, an information size adjustment is performed between the size of downlink assignment control information and the size of uplink assignment control information. Thus, even in common search space, it is possible to transmit uplink assignment control information to the terminal without increasing the number of times of blind detection by the terminal.

Thus, a terminal requires both control information included in a UE specific search space and control information included in a common search space, so that the terminal needs to perform blind detection for all uplink control information and downlink control information included in the UE specific search space and uplink control information and downlink control information included in the common search space.

FIG. 1 shows the transmissions of PDCCH signals by format 0 and format 1A. In FIG. 1, as mentioned above, in each UE specific search space and common search space, PDCCH signals are transmitted by format 0 and format 1A. In FIG. 1, the downlink bandwidth is 15 MHz and the uplink bandwidth is 20 MHz. The size of assignment control information depends on the bandwidth, so that, when comparing the information size (the size of format 1A) required for the downlink assignment decided from the downlink bandwidth and the information size (the size of format 0) required for the uplink assignment decided from the uplink bandwidth, the latter is larger. Thus, the pairs of a downlink band and an uplink band are used between the base station and the terminal as shown in FIG. 1, zero padding is performed to the downlink assignment control information to adjust the size of format 1A to the size of format 0.

Also, the standardization of 3GPP LTE-advanced has been started to realize faster communication than 3GPP LTE. A 3GPP LTE-advanced system (hereinafter referred to as "LTE-A system") follows a 3GPP LTE system (hereinafter referred to as "LTE system"). In 3GPP LTE-advanced, to realize a downlink transmission speed equals or exceeds maximum 1 Gbps, a base station and a terminal which can communicate in wideband frequency of 40 MHz or more are expected to be introduced.

With an LTE-A system, to realize a communication by ultra fast transmission speed that is several times as fast as transmission speed in an LTE system, and backward compatibility for the LTE system at the same time, a band for the LTE-A system is divided into "component bands" that are LTE supporting bandwidths and that are equal to or lower than 20 MHz. "Component band" is a bandwidth for maximum 20 MHz here and is defined as the basic unit of a communication band. Furthermore, "component band" in a downlink (hereinafter referred to as "downlink component band") is defined as a band separated by downlink frequency bandwidth information in a BCH broadcasted from a base station, or a band defined by the range of distribution when a downlink control channel (PDCCH) is arranged in a distributed manner. Also, "component band" in an uplink (hereinafter referred to as "uplink component band") is defined as a band separated by uplink frequency bandwidth information in a BCH broadcasted from a base station, or the basic unit of a communication band of 20 MHz or less including a PUSCH (Physical Uplink Shared CHannel) near the center, and a PUCCH for an LTE on both ends. Also, in 3GPP LTE-Advanced, "component band" may be designated as "Component Carrier(s)" in English.

In an LTE-A system, the communication using the bandwidth that bundles a few of these component bands, so-called "Carrier aggregation" is supported. Generally, throughput requirements for an uplink and a downlink are different, so that in an LTE-A system, studies are underway to use the carrier aggregation in which the number of component bands set for an arbitrary terminal (hereinafter "LTE-A terminal") associated with the LTE-A system, so-called "asymmetric carrier aggregation." Furthermore, the case will also be supported where the numbers of component bands are asymmetric between an uplink and a downlink, and where all component bands have different frequency bandwidths.

FIGS. 2A-B show an asymmetric carrier aggregation applied to a dedicated terminal and its control sequence. FIGS. 2A-B show an example in which the bandwidths and the numbers of component bands of an uplink and a downlink of the base station are symmetric.

In FIGS. 2A-B, although as for terminal 1, a configuration is carried out to perform the carrier aggregation using two downlink component bands and one uplink component band of the left side, as for terminal 2, a configuration is carried out to use the uplink component band of the right side for the uplink communication, even though a configuration is carried out to use the same two downlink component bands as in terminal 1.

When focusing on terminal 1, between the LTE-A base station and the LTE-A terminal that form an LTE-A system, the transmission and reception of signals are performed according to the sequence diagram shown in FIG. 2A. As shown in FIG. 2A, (1) when starting communication with a base station, terminal 1 synchronizes with the left side downlink component band and reads from broadcast signals called SIB2 (System Information Block Type 2), the information of an uplink component band that forms a pair with the left side downlink component band. (2) By using this uplink component band, terminal 1, for example, sends a connection request to the base station, and by this means starts communication with the base station. (3) When determining that a plurality of downlink component bands need to be assigned to a terminal, the base station commands the terminal to add downlink component bands. However, in this case, the number of an uplink component band does not increase, and asymmetric carrier aggregation starts in terminal 1, that is a dedicated terminal

CITATION LIST

Non-Patent Literature

NPL 1
3GPP TS 36.211 V8.5.0, "Physical Channels and Modulation (Release 8)," December 2008
NPL 2
3GPP TS 36.212 V8.5.0, "Multiplexing and channel coding (Release 8)," December 2008
NPL 3
3GPP TS 36.213 V8.5.0, "Physical layer procedures (Release 8)," December 2008

SUMMARY OF INVENTION

Technical Problem

Meanwhile, as mentioned above, in FIGS. 2A-B, one uplink component band (which is in the left side) and two downlink component bands are configured to terminal 1. Thus, as for terminal 1, both two downlink component bands are associated with the left side uplink component band. As shown in FIG. 3, regardless of the PDCCH signal of whichever downlink component band the base station uses to transmit an uplink assignment control signal (format 0) to terminal 1, terminal 1 transmits a PUSCH (Physical Uplink Shared CHannel) in the left uplink component band. Thus, to transmit, in the right downlink component band, assignment control information (format 0) of the left uplink component band and downlink assignment control information (format 1A) of the downlink component band, to terminal 1, and to reduce the number of times of blind detection of terminal 1, the base station has to determine this information size in accordance with the left side uplink component bandwidth and the right side downlink component bandwidth.

However, a broadcast signal transmitted in the right downlink component band (for example, D-BCH) is necessary for both an LTE-A terminal and an LTE terminal. Thus, scheduling information about that broadcast signal (which is informed by format 1A) has to be able to be received by an LTE terminal. Thus, given that the reception of a broadcast signal that is necessary for both an LTE-A terminal and an LTE terminal, it is necessary to compare the information size determined by the bandwidth of a downlink component band in which this broadcast signal is transmitted, and the information size determined by the bandwidth of the uplink component band which is made as a pair with this downlink component band in an LTE system, and to perform zero padding using the larger one as the size adjustment reference.

Although assignment control information of the left uplink component band has to be transmitted in the right side downlink component band as above, without making both an LTE-A terminal and an LTE terminal have difficulty reception broadcast signals and without increasing the number of times of blind detection on the LTE-A terminal, it is difficult to realize.

It is therefore an object of the present invention to provide a radio terminal, radio base station, channel signal forming method and channel signal reception method to reduce the number of times of blind detection in a reception process of assignment control information without causing any problems on reception broadcast signals.

Solution to Problem

One aspect of the radio base station of the present invention that has a plurality of uplink component bands and a plurality of downlink component bands as a communication band for the radio base station, sets for each radio terminal a component band group formed with the uplink component band in the communication band and a plurality of downlink component bands associated with the uplink component band, and is able to communicate with the radio terminal using the component band group, the radio base station employs a configuration having: a forming section that forms for each downlink component band the first channel signal that has a common search space that is common among a plurality of radio terminals and a user equipment specific search space that is individually assigned to each radio terminal; and an information size adjusting section that adjusts information sizes of uplink control information and downlink control information that are to be sent to an arbitrary transmission target terminal and that are included in the formed first channel signal, based on the size adjustment reference, in the common search space of a downlink additional component band that is included in the component band group, the downlink additional component band being not a basic component band that is a downlink component band in the component band group, and that is a downlink component band in which a broadcast channel signal that includes information about the uplink component band of the component band group is transmitted, using, as a common size adjustment reference among a plurality of radio terminals, the larger one of: the information size of downlink assignment control information determined from the bandwidth of the downlink additional component band; and the information size of uplink assignment control information determined from the bandwidth of the uplink component band that is associated with the downlink additional component band in the broadcast channel signal transmitted in the downlink additional component band, and in the user equipment specific search space of the downlink additional component band, using, as the size adjustment reference for each radio terminal, the larger one of the information size of downlink assignment control information determined from the bandwidth of the downlink additional component band and the information size of uplink assignment control information determined from the bandwidth of the uplink component band.

One aspect of the radio terminal of the present invention that is able to communicate with a radio base station by using a component band group that includes an uplink component band and a plurality of downlink component bands associated with the uplink component band and that is set by the radio base station, the radio terminal employs a configuration having: a radio reception section that has a common search space that is common among a plurality of ration terminals and a user equipment specific search space that is individually assigned to each radio terminal and that receives from each downlink component band the first channel signal that includes uplink assignment control information or downlink assignment control information; a determining section that determines the basic information size to use for a reception process of the first channel signal of each downlink component band; and a channel signal reception process section that performs the reception process of the first channel signal based on the basic information size, where in the common search space of a downlink additional component band that is included in the component band group, the downlink additional component band being not a basic component band that is a downlink component band in the component band group that is set for the radio terminal, and that is a downlink component band in which a broadcast channel signal that includes information about the uplink component band of the component band group is transmitted, the determining section determines the basic information size based on the larger one of: the information size of downlink assignment control information determined from the bandwidth of the downlink additional component band; and the information size of uplink assignment control information determined from the bandwidth of the uplink component band that is associated with the downlink additional component band in the broadcast channel signal transmitted in the downlink additional component band; and in the user equipment specific search space of the downlink additional component band, the determining section determines the basic information size based on the larger one of the information size of downlink assignment control information determined from the bandwidth of the downlink additional component band and the information size of uplink assignment control information determined from the bandwidth of the uplink component band.

One aspect of the channel signal forming method of the present invention that forms a channel signal for each downlink component band included in a component band group formed by an uplink component band and a plurality of downlink component bands associated with the uplink component band, the method includes the steps of: forming for each downlink component band the first channel signal that has a common search space that is common among a plurality of radio terminals and a user equipment specific search space that is individually assigned to each radio terminal; and adjusting information sizes of uplink assignment control information and downlink assignment control information that are included in the formed first channel signal, based on the size adjustment reference, where in the common search space of a downlink additional component band that is included in the component band group, the downlink additional component band being not a basic component band that is a downlink component band in the component band group, and that is a downlink component band in which a broadcast channel signal that includes information about the uplink component band of the component band group is transmitted, the larger one of: the information size of downlink assignment control information determined from the bandwidth of the downlink additional component band; and the information size of uplink assignment control information determined from the bandwidth of the uplink component band that is associated with the downlink additional component band in the broadcast channel signal transmitted in the downlink additional component band, is determined as the common size adjustment reference among a plurality of radio terminals, and in the user equipment specific search space of the downlink additional component band, the larger one of the information size of downlink assignment control information determined from the bandwidth of the downlink additional component band and the information size of uplink assignment control information determined from the bandwidth of the uplink component band, is determined as the size adjustment reference for each radio terminal.

One aspect of the channel signal reception method of the present invention that receives a channel signal of each downlink component band included in the component band group formed by an uplink component band and a plurality of downlink component bands associated with the uplink component band, the method includes the steps of: receiving via radio the first channel signal that includes uplink assignment control information or downlink assignment control information, while having a common search space that is common among a plurality of radio terminals and a user equipment specific search space that is individually assigned to each radio terminal; determining the basic information size to use for reception process of the first channel signal of each downlink component band; and performing reception process of the first channel signal based on the basic information size, where in a common search space of a downlink additional component band that is included in the component band group, the downlink additional component band being not a basic component band that is a downlink component band in the component band group that is set for the radio terminal, and that is a downlink component band in which a broadcast channel signal that includes information about the uplink component band of the component band group is transmitted, the basic information size is determined based on the larger one of: the information size of downlink assignment control information determined from the bandwidth of the downlink additional component band; and the information size of uplink assignment control information determined from the bandwidth of the uplink component band that is associated with the downlink additional component band in the broadcast channel signal transmitted in the downlink additional component band, and in a user equipment specific search space of the downlink additional component band, the basic information size is determined based on the larger one of the information size of downlink assignment control information determined from the bandwidth of the downlink additional component band and the information size of uplink assignment control information determined from the bandwidth of the uplink component band.

Advantageous Effects of Invention

The present invention provides a radio terminal, radio base station, channel signal forming method and channel signal reception method to reduce the number of times of blind detection in a reception process of assignment control information without causing any problems on receiving broadcast signals.

DESCRIPTION OF EMBODIMENTS

Now, an embodiment of the present invention will be explained in detail with reference to the accompanying drawings.

Figure 1:
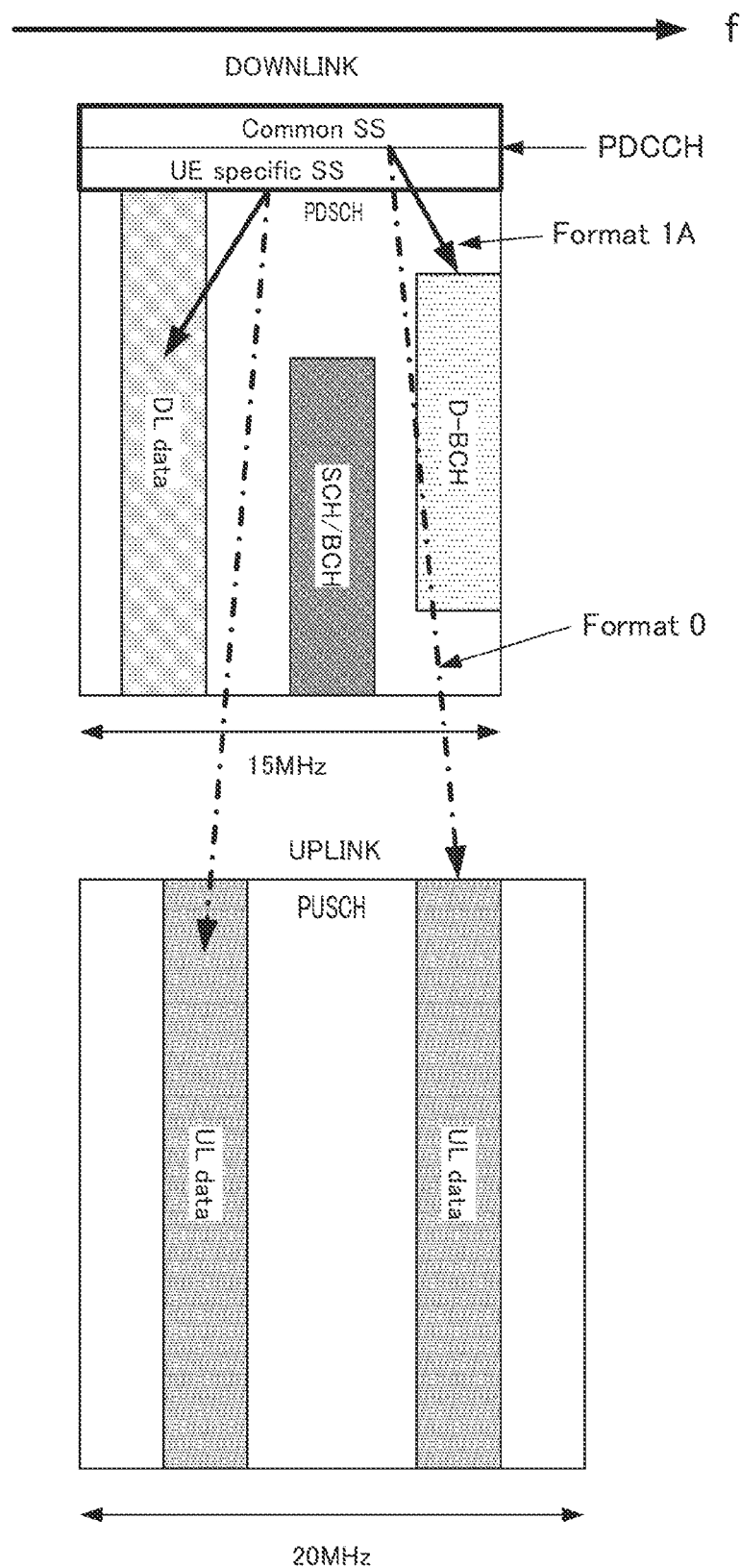
FIG. 1 shows transmissions of PDCCH signals by format 0 and format 1A.
Figure 2B:
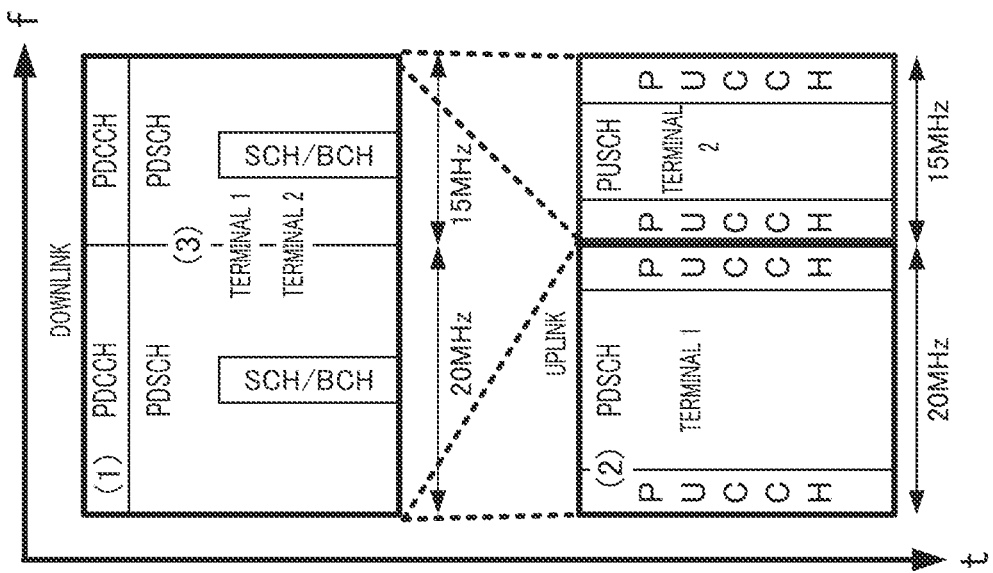
FIGS. 2A-B show an asymmetric carrier aggregation, applied to a dedicated terminal, and its control sequence.
Figure 2A:
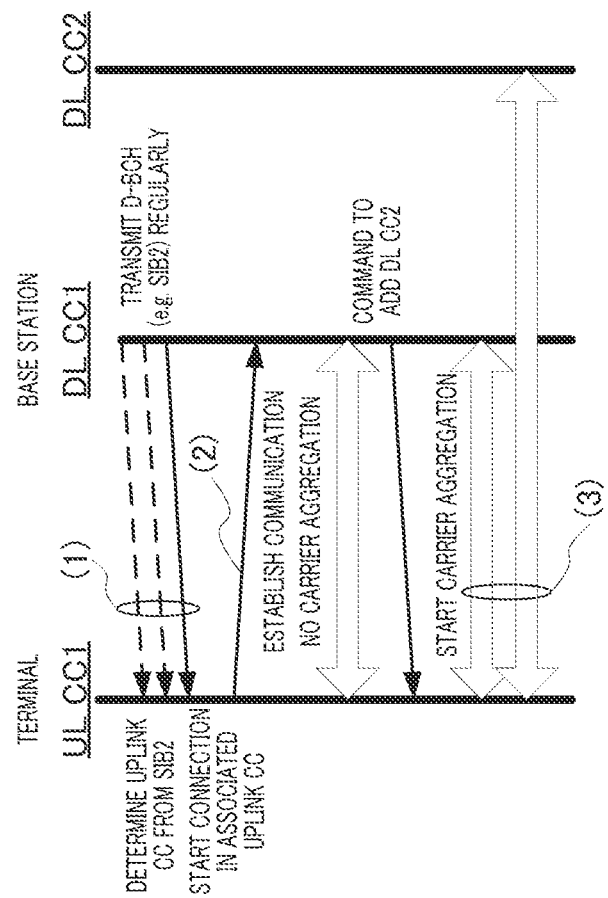
Figure 3:
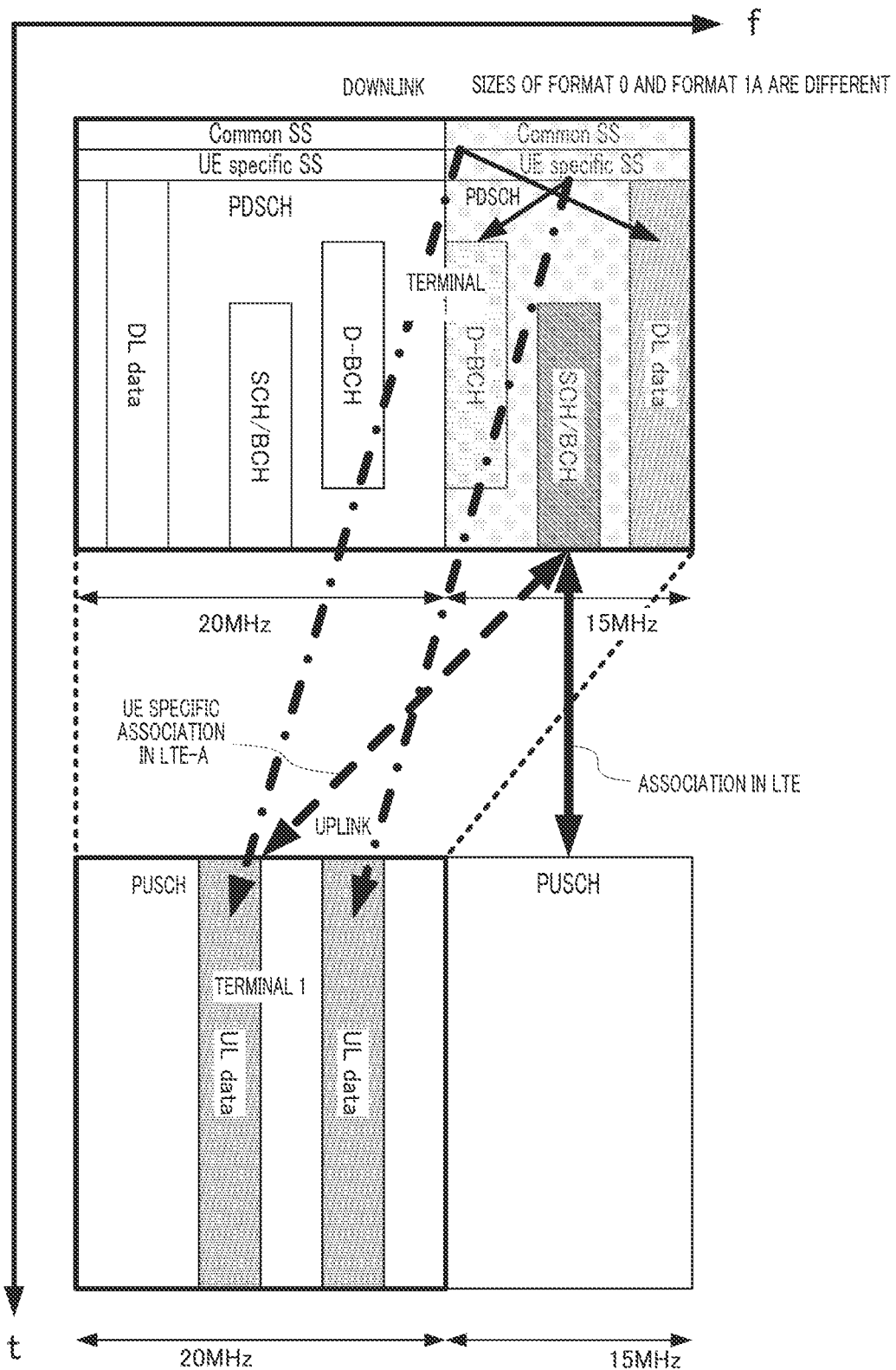
FIG. 3 shows an asymmetric carrier aggregation applied to a dedicated terminal.
Figure 4:
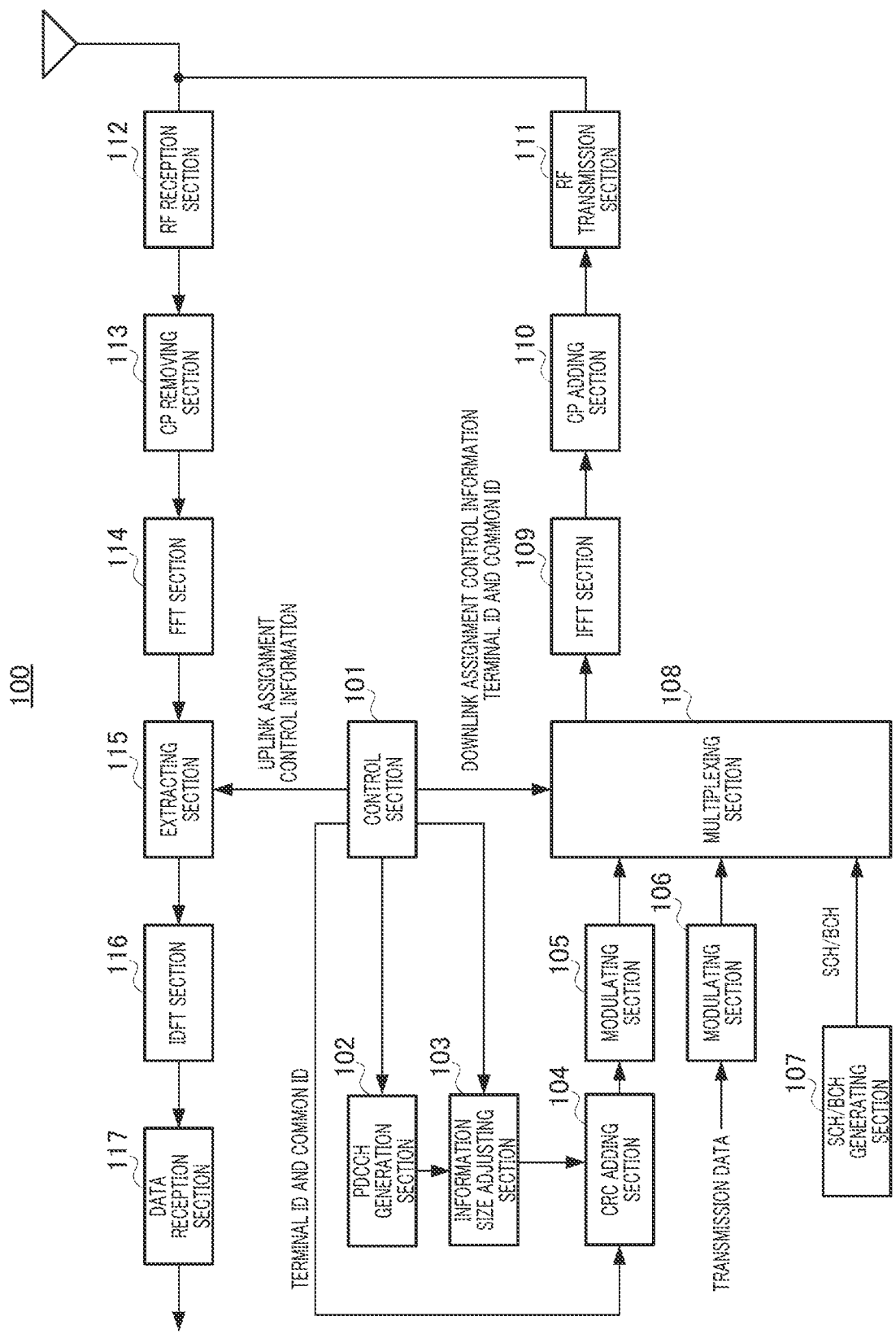
FIG. 4 is a block diagram showing a configuration of a base station according to an embodiment of the present invention.

FIG. 4 is a block diagram showing a configuration of base station 100 according to an embodiment of the present invention. In FIG. 4, base station 100 includes control section 101, PDCCH generating section 102, information size adjusting section 103, CRC (Cyclic Redundancy Check) adding section 104, modulating sections 105 and 106, SCH/BCH generating section 107, multiplexing section 108, IFFT section 109, CP adding section 110, RF transmission section 111, RF reception section 112, CP removing section 113, FFT section 114, extracting section 115, IDFT section 116, and data reception section 117. Base station 100 is configured to be able to communicate with terminal 200 (described later) using a component band group composed of an uplink component band and a plurality of downlink component bands associated with the uplink component band. The component band group is set for every terminal 200 and is noticed to terminal 200 in advance. Some or all of a plurality of component bands composing the component band group assigned to first terminal 200 may overlap with constituent component bands of the component band group assigned to second terminal 200.

Control section 101 generates control information (including uplink assignment control information and downlink assignment control information) and space assignment information indicating to which one of a UE specific search space or a common search space each piece of control information is assigned. This control information includes component band group setting information individually assigned to each terminal 200, "basic component band information" (described later), dedicated assignment control information, such as resource assignment information in component bands composing a component band group, and common assignment control information which is common to all terminals 200 that receive broadcast signals from the target component band. While UE specific search space assignment control information is generated for control information to be assigned to each terminal 200 on a dedicated basis, common search space assignment information is generated for common control information that is common for all terminals 200.

A downlink component band that is set for arbitrary terminal 200 by control section 101, and in which a BCH, which broadcasts the information about an uplink component band forming the component band group informed to terminal 200 in advance, is transmitted, is "basic component band" for the target terminal, and the information about this basic component band is the above "basic component band information." Arbitrary terminal 200 reads BCH information, and by this means this basic component band information can be recognized.

Control section 101 outputs to information size adjusting section 103 information size comparing information 1 that shows the comparing information sizes of downlink assignment control information determined by the bandwidth of the basic component band and uplink assignment control information determined by the bandwidth of an uplink component band, and information size comparing information 2 that shows the comparing information sizes of downlink assignment control information determined by the bandwidth of a downlink component band other than the basic component band and uplink assignment control information determined by the bandwidth of an uplink component band.

PDCCH generating section 102 receives control information and space assignment information generated in control section 101, and generates a PDCCH signal subject to be sent in each downlink component band, based on these control information and space assignment information.

Also, while mapping common assignment control information to the common search space of each PDCCH signal, PDCCH generating section 102 maps dedicated assignment control information to a UE specific search space. This process of sorting common assignment control information and dedicated assignment control information is performed based on space assignment information.

Information size adjusting section 103 receives control information and space assignment information generated in control section 101. Based on these control information and space assignment information, information size adjusting section 103 adjusts the information size of uplink assignment control information and downlink assignment control information included in PDCCH signals received from PDCCH generating section 102.

Specifically, based on basic component band information, information size adjusting section 103 determines whether a PDCCH signal subject to information size adjustment should be transmitted in the basic component band or in a different downlink component band.

In the common search space of the first PDCCH signal which is sent in a downlink component band other than the basic component band, information size adjusting section 103 uses the larger one of the information size of downlink assignment control information determined from the bandwidth of the target downlink component band in which the first PDCCH signal is sent, and the information size of uplink assignment control information determined from the bandwidth of an uplink component band (which is not necessarily included in the component band group for terminal 200) associated by broadcast signals in the target downlink component band, as a size adjustment reference, and, based on this size adjustment reference, information size adjusting section 103 adjusts the information sizes of uplink assignment control information and downlink assignment control information. However, the common search space of the first PDCCH signal is a common search space for a plurality of terminals 200 that should receive the broadcast signal in the target component band. In the UE specific search space of the first PDCCH signal, information size adjusting section 103 uses the larger one of the information size of downlink assignment control information determined from the bandwidth of the target downlink component band in which the first PDCCH signal is sent, and the information size of uplink assignment control information determined from the bandwidth of an uplink component band in the component band group of terminal 200, as a size adjustment reference, and, based on this size adjustment reference, information size adjusting section 103 adjusts the information sizes of uplink assignment control information and downlink assignment control information. However, a UE specific search space of the first PDCCH signal is a space that, for example, associated with terminal ID and set for every terminal 200.

Meanwhile, as for the second PDCCH signal (that is, a PDCCH signal includes both uplink assignment control information and downlink assignment control information) subject to be sent in the basic component band, both in the common search space and the UE specific search space, information size adjusting section 103 uses the larger one of the information size of downlink assignment control information determined from the bandwidth of the target downlink component band in which the second PDCCH signal is sent, and the information size of uplink assignment control information determined from the bandwidth of an uplink component band in the component band group of terminal 200, as size adjustment reference, and, based on this size adjustment reference, information size adjusting section 103 adjusts the information sizes of uplink assignment control information and downlink assignment control information.

To be more specific, information size adjusting section 103 includes a padding section (not shown) to adjust the information size of control information by adding zero information to control information. This padding section adds zero information to the smaller information size until the information sizes of downlink assignment control information and uplink assignment control information have equal information size. To which one of downlink assignment control information and uplink assignment control information zero information is added is determined based on information size comparing information.

Also, in the common search space of the first PDCCH signal, the padding section adds zero information to uplink assignment control information or downlink assignment control information, until it becomes equal to the target information size determined from the larger one of the information size of downlink assignment information determined from the bandwidth of the target downlink component band in which the first PDCCH signal is sent, and the information size of uplink assignment control information determined from the bandwidth of the uplink component band (which is not necessarily included in the component band group of terminal 200) associated by the broadcast signal in the target downlink component band. Also, in the UE specific search space of the first PDCCH signal, the padding section adds zero information to uplink assignment control information or downlink assignment control information, until it becomes equal to the target information size determined from the larger one of the information size of downlink assignment information determined from the bandwidth of the target downlink component band, and the information size of uplink assignment control information determined from the bandwidth of the uplink component band of the component band group of terminal 200.

Here, even if the downlink component band of first terminal 200 and the downlink component band of second terminal 200 overlap, uplink component bands included in the component band group of each terminal may be different. In other words, even if the downlink component band of first terminal 200 and the downlink component band of second terminal 200 overlap, the overlapped downlink component band may be the basic component band for first terminal 200 and may be a component band other than the basic component band for second terminal 200.

For this reason, the information size adjustment process of uplink assignment control information and downlink assignment control information in information size adjusting section 103 is performed for each piece of assignment control information included in the target PDCCH signal, based on the reference applied to destination terminal 200 of the assignment control information.

CRC adding section 104 adds a CRC bit to a PDCCH signal whose size is adjusted in information size adjusting section 103, and then masks the CRC bit with a terminal ID. However, scheduling information related to the broadcast signals which a plurality of terminals need to receive is masked by an ID (that is, a common ID) that is set in common between a plurality of terminals. Then, CRC adding section 104 outputs the masked PDCCH signal to modulating section 105.

Modulating section 105 modulates a PDCCH signal input from CRC adding section 104, and outputs the modulated PDCCH signal to multiplexing section 108.

Modulating section 106 modulates input transmission data (that is downlink channel data), and outputs modulated transmission data signals to multiplexing section 108.

SCH/BCH generating section 107 generates a SCH and a BCH, and outputs the generated SCH and BCH to multiplexing section 108.

Multiplexing section 108 multiplexes the PDCCH signal input from modulating section 105, the data signal (that is, a PDSCH signal) input from modulating section 106, and the SCH and BCH input from SCH/BCH generating section 107. Based on the terminal ID input from control section 101 and downlink assignment control information associated with the target terminal ID, multiplexing section 108 maps a data signal (a PDSCH signal) for terminal 200 associated with the terminal ID to a downlink component band.

Also, multiplexing section 108 maps the PDCCH signal input from modulating section 105, to the dedicated resource space and the common resource space in the resource space assigned for a PDCCH. Specifically, the PDCCH signal associated with a data signal which only a certain terminal should receive, is mapped to the resource associated with the terminal ID of the target terminal in a dedicated resource space, and the PDCCH signal associated with a data signal which a plurality of terminals should receive at once, is mapped to the resource in the common resource space.

IFFT section 109 converts a multiplex signal into a time waveform, and CP adding section 110 acquires an OFDM signal by adding a CP to this time waveform.

RF transmission section 111 performs a radio transmission process (such as up-conversion and a digital-to-analog (D/A) conversion) to an OFDM signal input from CP adding section 110, and transmits the result through an antenna. Then, an OFDM signal including assignment control information is sent.

RF reception section 112 performs a radio reception process (such as a down-conversion and an analog-to-digital (A/D) conversion) to a received radio signal which is received in a reception band through an antenna, and outputs the received signal to CP removing section 113.

CP removing section 113 removes the CP from the received signal, and FFT section 114 converts the received signal, from which the CP has been removed, into a frequency domain signal.

Based on uplink assignment control information input from control section 101, extracting section 115 extracts uplink channel data from a frequency domain signal input from FFT section 114, and IDFT (Inverse Discrete Fourier Transform) section 116 converts the extracted signal into a time domain signal and outputs the time domain signal to data reception section 117.

Data reception section 117 decodes the time domain signal input from IDFT section 116. And data reception section 117 outputs decoded uplink data as received data.

Figure 5:
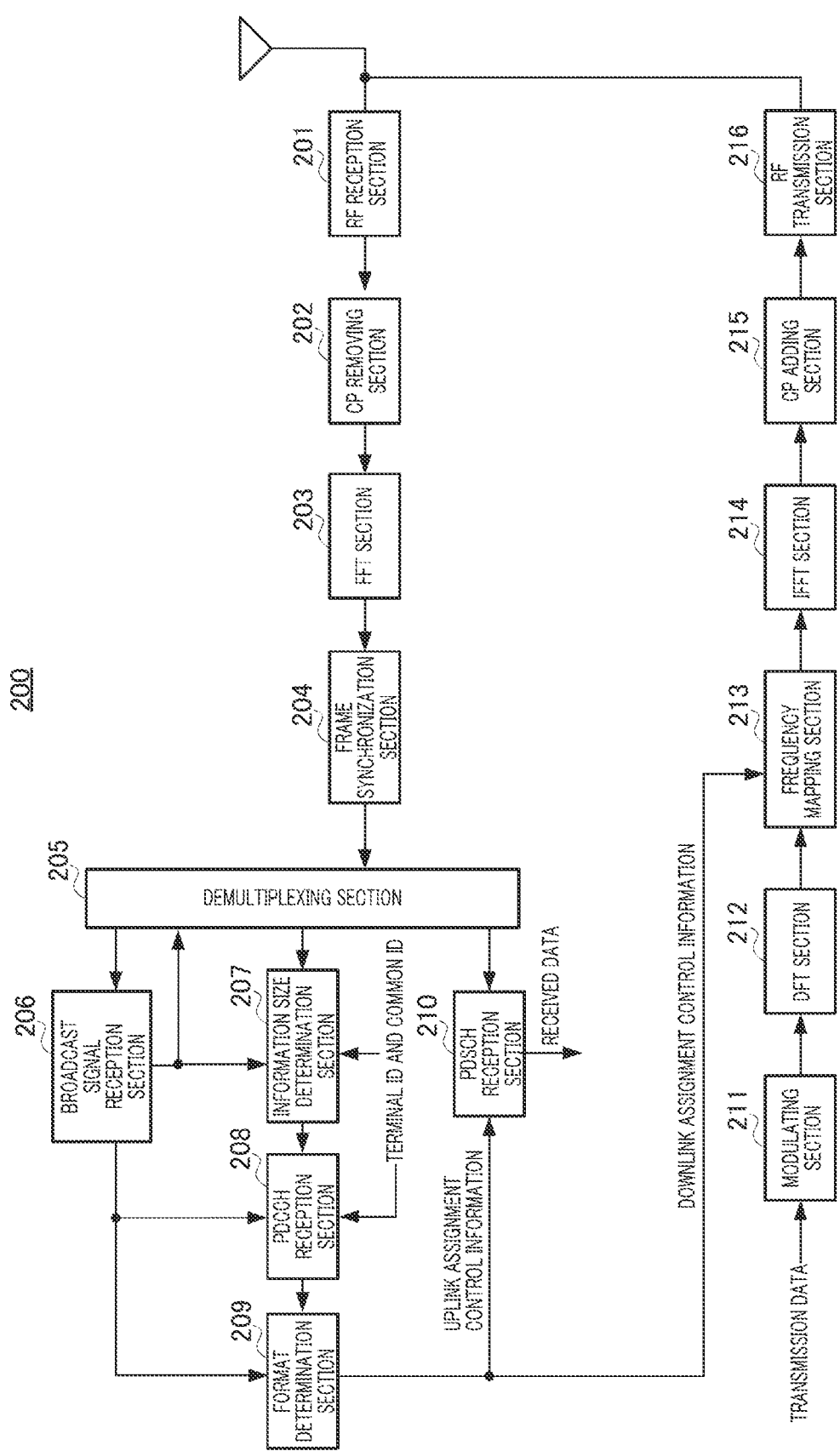
FIG. 5 is a block diagram showing a configuration of a terminal according to an embodiment of the present invention.

FIG. 5 is a block diagram showing the configuration of terminal 200 according to an embodiment of the present invention. In FIG. 5, terminal 200 includes RF reception section 201, CP removing section 202, FFT section 203, frame synchronization section 204, demultiplexing section 205, broadcast signal reception section 206, information size determination section 207, PDCCH reception section 208, format determination section 209, PDSCH reception section 210, modulating section 211, DFT section 212, frequency mapping section 213, IFFT section 214, CP adding section 215, and RF transmission section 216.

RF reception section 201 performs a radio reception process (such as a down-conversion and an analog-to-digital (A/D) conversion) to a received radio signal (in this case, an OFDM signal) which is received in a reception band through an antenna, and outputs the received signal to CP (Cyclic Prefix) removing section 202.

CP removing section 202 removes the CP from the received signal, and FFT (Fast Fourier Transform) section 203 converts the received signal, from which the CP has been removed, into a frequency domain signal. This frequency domain signal is output to frame synchronization section 204.

While searching for a SCH included in a signal input from FFT section 204, frame synchronization section 203 establishes synchronization (frame synchronization) with base station 100. Also, frame synchronization section 204 acquires a cell ID associated with a sequence used for a SCH (a SCH sequence). That is, the same process as a normal cell search is performed in frame synchronization section 204. Also, to demultiplexing section 205, frame synchronization section 204 outputs frame synchronization timing information showing a frame synchronization timing, and the signal input from FFT section 203.

Based on frame synchronization timing information input from frame synchronization section 204, demultiplexing section 205 demultiplexes the signal input from frame synchronization section 204 into a broadcast signal (that is, a BCH), a control signal (that is, a PDCCH signal), and a data signal (that is, a PDSCH signal). Demultiplexing section 205 receives information about a downlink component band from broadcast signal reception section 206, and extracts a PDCCH signal on a per downlink component band basis based on this information.

Broadcast signal reception section 206 reads the contents of a BCH input from demultiplexing section 205, and acquires information related to the configuration of the downlink band and uplink band of base station 100. Broadcast signal reception section 206 acquires, for example, the numbers of downlink component bands, the identification number, and the bandwidths of each component band. Broadcast signal reception section 206 acquires information related to an uplink component band included in a BCH assigned in a plurality of downlink component bands. Among a plurality of uplink component bands, broadcast signal reception section 206 determines the downlink component band, in which a BCH that is a source of information about the uplink component band (that is, an uplink component band included in component band group that terminal 200 should use) that terminal 200 informed from base station 100 in advance should use, is transmitted, as "basic component band" for terminal 200, and generates the basic component band information. Broadcast signal reception section 206 outputs acquired BCH information and the basic component band information to information size determination section 207, PDCCH reception section 208, and format determination section 209.

Information size determination section 207 receives a PDCCH signal from demultiplexing section 205, and determines the basic information size on performing blind detection on this PDCCH signal. This basic information size is determined based on basic component band information received from broadcast signal reception section 206, and the bandwidths of each component band.

Specifically, while in the common search space of a PDCCH signal of a downlink component band other than the basic component band, information size determination section 207 determines the basic information size based on the larger one of the information size of downlink assignment control information determined from the bandwidth of the target downlink component band in which the PDCCH signal is sent, and the information size of uplink assignment control information determined from the bandwidth of an uplink component band (which is not necessarily included in the component band group of terminal 200) associated by the broadcast signal in the target down link component band, in the UE specific search space, information size determination section 207 determines the basic information size based on the larger one of the information size of downlink assignment control information determined from the bandwidth of the target downlink component band and the information size of an uplink assignment control information determined from the bandwidth of the uplink component band in the component band group of terminal 200.

As for a PDCCH signal of the basic component band, in both the common search space and the UE specific search space, information size determination section 207 determines the basic information size based on the larger one of the information size of downlink assignment control information determined from the bandwidth of the target downlink component band in which the PDCCH signal is sent, and the information size of uplink assignment control information determined from the bandwidth of an uplink component band in the component band group of terminal 200.

Information size determination section 207 outputs information about the decided basic information size and the PDCCH signal associated with this information to PDCCH reception section 208.

PDCCH reception section 208 performs blind detection for a PDCCH signal based on the basic information size decided in information size determination section 207.

That is, PDCCH reception section 208 specifies the CRC bit part by using the basic information size (payload size) decided in information size determination section 207. Next, after demasking the specified CRC bit part using the terminal ID of terminal 200 in the UE specific search space, PDCCH reception section 208 determines the PDCCH signal as a PDCCH signal transmitted for terminal 200, if the CRC calculation result is "OK" with respect to the whole PDCCH signal. However, since in a common search space there is a possibility that both assignment information for terminal 200 and assignment information to be received by a plurality of terminals (for example, scheduling information of broadcast signals) may be sent, in a common search space, PDCCH reception section 208 performs both damasking processes by the terminal ID of terminal 200 and damasking process by an ID set in common between a plurality of terminals, and executes the CRC calculation. Thus, the PDCCH signal decided to be received by terminal 200 is output to format determination section 209.

Based on type information of assignment control information included in a PDCCH signal received from PDCCH reception section 208, format determination section 209 determines whether the format of the PDCCH signal is format 0 or format 1A. When determining as format 0, format determination section 209 outputs uplink assignment control information included in the PDCCH signal, to frequency mapping section 213. Also, when determining as format 1A, format determination section 209 outputs downlink assignment control information included in the PDCCH signal, to PDSCH reception section 210.

Based on downlink assignment control information input from format determination section 209, PDSCH reception section 210 extracts received data from the PDSCH signal input from demultiplexing section 205.

Modulating section 211 modulates transmission data and outputs a resulting modulated signal to DFT (Discrete Fourier Transform) section 212.

DFT section 212 converts a modulated signal input from modulating section 211 into a frequency domain, and outputs a resulting plurality of frequency components to frequency mapping section 213.

In accordance with uplink assignment control information input from format determination section 209, frequency mapping section 213 maps a plurality of frequency components input from DFT section 212, on a PUSCH placed in an uplink component band.

IFFT section 214 converts a mapped plurality of frequency components into a time domain waveform, and CP adding section 215 adds a CP to the time domain waveform.

RF transmission section 216 performs a radio transmission process (such as an up-conversion and a digital-to-analog (D/A) conversion) to a signal with a CP, and transmits it through an antenna.

Figure 6:
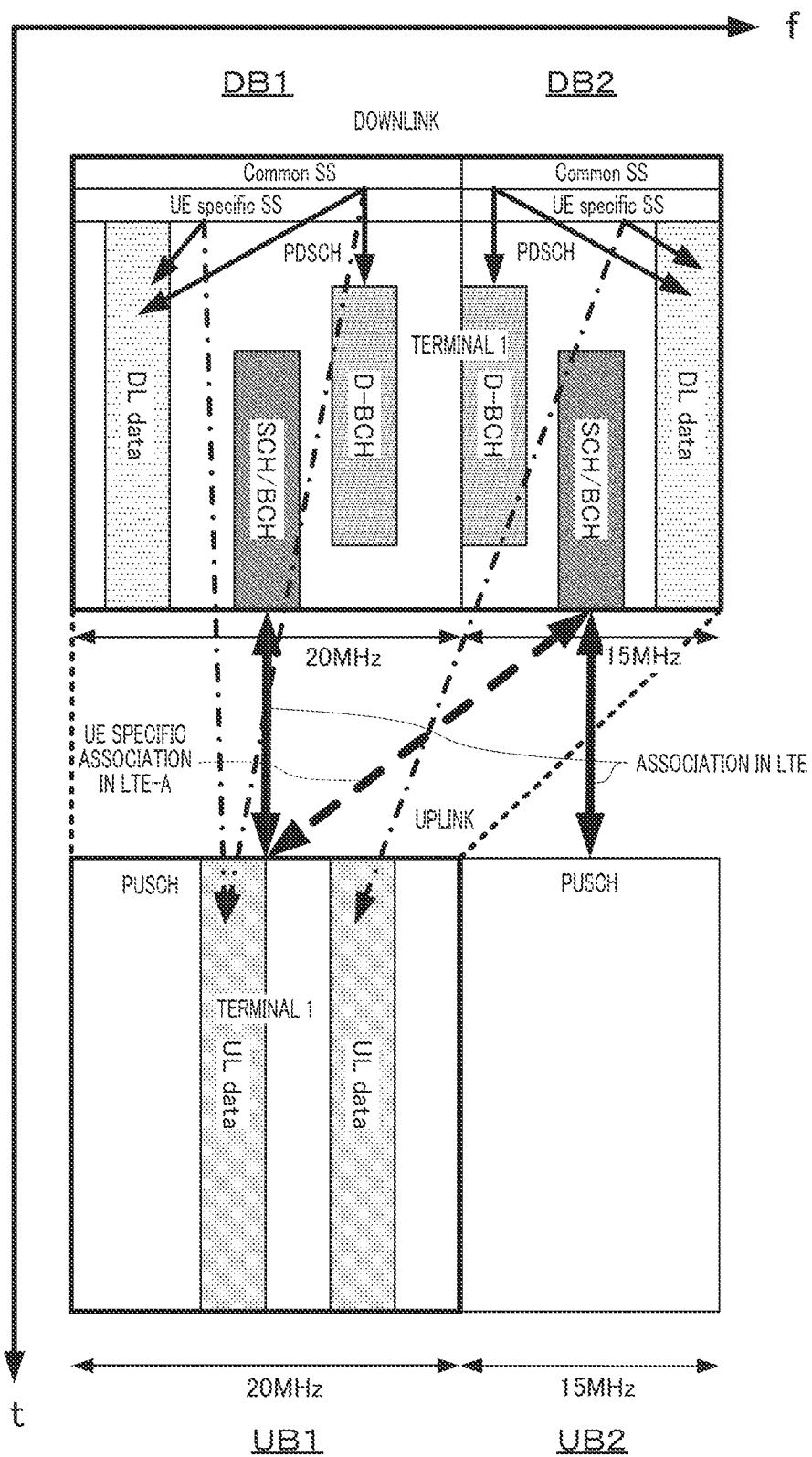
FIG. 6 shows operations of a base station and a terminal.

Next, an operation of base station 100 and terminal 200, which have the above mentioned configurations, will be described. FIG. 6 is a view for explaining operations of base station 100 and terminal 200.

In FIG. 6, base station 100 has two downlink component bands DB 1 and 2, and two uplink component bands UB 1 and 2, as the communication bands of base station 100. In FIG. 6, the bandwidths of UB 1 and DB 1 are 20 MHz and the bandwidths of DB 2 and UB 2 are 10 MHz. DB 1 forms a pair band with UB 1, DB 2 forms an uplink and a downlink pair bands with UB 2 respectively. In these pair bands, base station 100 accommodates conventional LTE terminals. Thus, base station 100 transmits in DB 1, a BCH including information about UB 1 and in DB 2 transmits a BCH including information about UB 2. By receiving a BCH, an LTE terminal can recognize the relationships of an uplink component band and a downlink component band.

In FIG. 6, one uplink component band UB 1 is associated with two downlink component bands DB 1 and DB 2 as component band groups of first terminal 200. Here, a BCH that broadcasts the information about an uplink component band in a component band group of first terminal 200 is transmitted from DB 1, so that, as for first terminal 200, DB 1 is the basic component band.

Base station 100 sets uplink component band UB 1 as uplink channel resource to first terminal 200, and downlink component bands DB 1 and 2 as downlink channel resource. Thus, the component band group associated with first terminal 200 is formed by DB 1, 2 and UB 1.

Then, base station 100 includes uplink assignment control information and downlink assignment control information into the PDCCH signal, and transmits these to terminal 200. In FIG. 6, the arrow from a PDCCH towards uplink data (UL Data) means that there is a possibility that uplink assignment control information may be sent in the PDCCH. Also, the arrow from a PDCCH towards downlink data (DL Data) or a D-BCH means that there is a possibility that downlink assignment control information may be sent in the PDCCH.

Also, in information size adjusting section 103, the information size of a PDCCH signal is adjusted if necessary. Specifically, with the basic component band, information size determination section 103 adds zero information to the smaller information size until the information size of downlink assignment control information determined from the bandwidth of the basic component band and the information size of uplink assignment control information determined from the bandwidth of an uplink component band in the component band group of first terminal 200, have equal information size. As for downlink assignment control information included in the common search space of the PDCCH signal sent with a component band other than the basic component band, information size adjusting section 103 adjusts the information size by using the larger one of the information size of downlink assignment control information determined from the bandwidth of a downlink component band in which the target downlink assignment control information is sent, and the information size of uplink assignment control information determined from the bandwidth of an uplink component band (which is not necessarily included in the component band group of first terminal 200) associated by the broadcast signal of the target downlink component band, as a size adjustment reference.

Meanwhile, the size of downlink assignment control information included in the UE specific search space of a PDCCH signal sent by a component band other than the basic component band is determined from the bandwidth of the downlink component band in which the target downlink assignment control information is sent, and the bandwidth of the uplink component band of the component band group of terminal 200.

Here, the above size adjusting method will be described in detail using a bandwidth of a component band shown in FIG. 6.

With DB 1 (the basic component band of first terminal 200) shown in FIG. 6 the information size adjustment is performed using the relationships of the bandwidth of DB 1 and the bandwidth of UB 1 as mentioned above. Thus, the bandwidths of DB 1 and UB 1 are both 20 MHz, so that the information amount necessary to report an uplink assignment resource and the information amount necessary to report a downlink assignment resource become equal. However, as for the information other than a resource report that is necessary for assignment control, a downlink is slightly (approximately 1 bit) larger than an uplink. Thus, in both a common search space and a UE specific search space of a PDCCH signal of DB 1, information size adjustment is performed assuming that Format 0 is padded slightly.

With DB 2 (a downlink component band other than the basic component band of first terminal 200) shown in FIG. 6, as mentioned above, in a common search space information size adjustment is performed using the relationships of the bandwidth of DB 2 and the bandwidth of UB 2, and in a UE specific search space information size adjustment is performed using the relationships of the bandwidth of DB 2 and the bandwidth of UB 1.

Thus, in the common search space of DB 2, both bandwidths of DB 2 and UB 2 are 15 MHz, so that information size adjustment is performed assuming that Format 0 is padded slightly.

Meanwhile, in the UE specific search space of DB 2, information size adjustment is performed assuming that Format 1A is padded substantially. This is because the bandwidth of UB 1 is 20 MHz, so that the information amount to report uplink assignment resource necessary for UB 1 becomes significantly larger than the information amount to report downlink assignment resource necessary for DB 2. Thus, with DB 2, the information size (payload size) of PDCCH subject to blind detection in terminal 200 is bigger in the UE specific search space than in the common search space.

Figure 7:
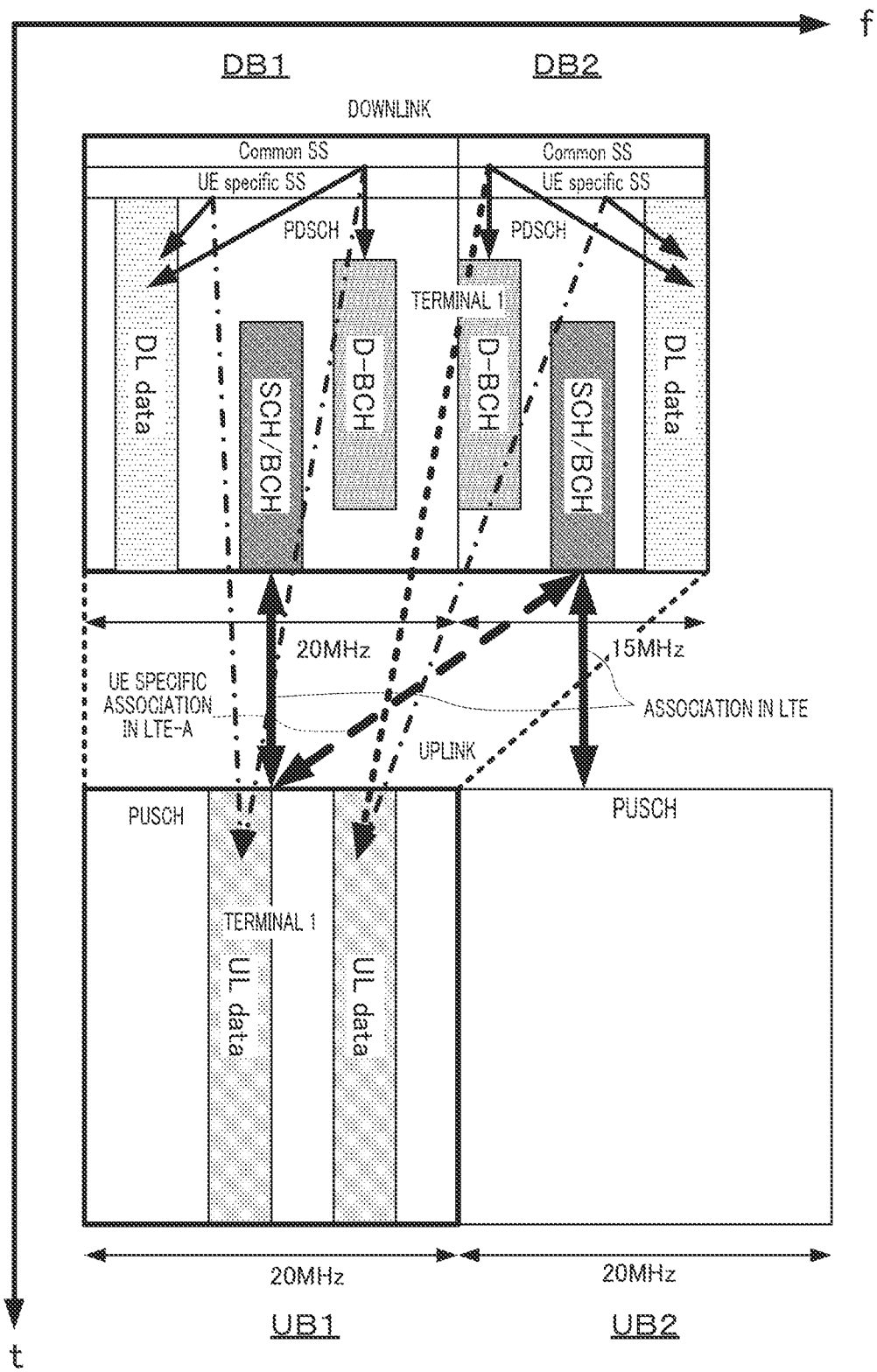
FIG. 7 shows operations of a base station and a terminal.

In other words, the information size that is the size adjustment reference of the common search space of DB 2 is small, so that it is not possible to map uplink assignment control information for terminal 200 to the common search space of DB 2 because the information size is not enough. By this means, in the configuration shown in FIG. 6, base station 100 is controlled not to map uplink assignment control information for terminal 200 to the common search space of DB 2. Note that, this control of not mapping is for the case where both DB 2 and UB 2 are smaller than UB 1. Meanwhile, for example, as shown in FIG. 7, when the bandwidth of UB 2 is 20 MHz as UB 1, even in the common search space of DB 2, information size adjustment is performed assuming that Format 1A is padded substantially, as in the UE specific search space. Thus, in this case, in the common search space, the information size of the PDCCH to which terminal 200 should perform blind detection, and the size of an uplink assignment control information which is necessary to report of UB 1 become equal, so that it becomes possible to transmit uplink assignment control information even from the common search space of DB 2.

According to the present embodiment, base station 100 has a plurality of uplink component bands and a plurality of downlink component bands as a communication band of base station 100, sets for each radio terminal the component band group formed by the uplink component band in the communication band and a plurality of downlink component bands associated with the target uplink component band, and is able to communicate with radio terminal 200 by using the component band group. Base station 100 is, for example, an LTE-A base station, and radio terminal 200 is, for example, an LTE-A terminal.

In base station 100, based on the size adjustment reference, information size adjusting section 103 adjusts the information sizes of uplink control information associated with an arbitrary target terminal and downlink control information, which are included in a PDCCH signal.

Specifically, in the common search space of a downlink component band (that is, a downlink additional component band) other than the basic component band but included in the component band group, information size adjusting section 103 uses the larger one of the information size of downlink assignment control information determined from the bandwidth of the downlink additional component band and the information size of uplink assignment control information determined from the bandwidth of the uplink component band associated with the downlink additional component band by the broadcast signal (a BCH) sent in the downlink additional component band, as the size adjustment reference. Meanwhile, in the UE specific search space of the downlink additional component band, information size adjusting section 103 uses the larger one of the information size of downlink assignment control information determined from the bandwidth of the downlink additional component band and the information size of uplink assignment control information determined from the bandwidth of the uplink component band of the component band group, as the size adjustment reference. The pairs of the downlink component band and the uplink component band, which are associated with the broadcast signal sent by this downlink component band, are also used in the LTE system. Thus, this association is related to the association in LTE. Meanwhile, the associations of a plurality of downlink component bands (which include the basic component band and the downlink additional component band) and an uplink component band in the component band group are individually associated with target terminals.

By setting as above, first, the UE specific search space individually assigned to each terminal can adopt the size adjustment reference according to the association in the component band group set for the target terminal, and it is possible to make the information size of downlink assignment control information and the uplink assignment control information equal by the size adjustment based on this size adjustment reference. By this means, it is possible to reduce the number of times of blind detection in the target terminal. Meanwhile, the common search space where scheduling information of broadcast signals is sent can adopt the size adjustment reference according to the basic association. By this means, even in a terminal using the component band pair according to the basic association, any problem on receiving broadcast signals is not produced.

The above has been explained assuming that information about the downlink additional component band in the component band group is noticed from base station 100 to terminal 200 by a dedicated channel. However, the present invention is not limited to this, and, for example, it is equally possible to broadcast the information about a terminal band group using a BCH+, when a BCH (a BCH+) that only an LTE-A terminal can receive is transmitted from base station 100, in addition to a BCH that both an LTE terminal and an LTE-A terminal can receive.

As mentioned above, depending on the relationships of bandwidths of an uplink component band and a downlink component band, it is equally possible to perform a control of not mapping the uplink frequency assignment to the common search space of a downlink component band other than the basic component band. When performing this control, in the common search space, only downlink frequency assignment is mapped, so that type information (Format indicator (1 bit)) of assignment control information that is usually included is unnecessary. Thus, it is equally possible to transmit a parity bit or to transmit other information by using the resource that is prepared to map type information of assignment control information.

According to the above explanation, in a UE specific search space of a downlink additional component band other than the basic component band, uplink assignment control information is reported. However, the present invention is not limited to this, and it is equally possible to determine the information size of a PDCCH in the UE specific search space of a downlink additional component band, only from the information size of downlink assignment control information determined from the bandwidth of the downlink additional component band, when uplink assignment information is not reported in the downlink component band other than the basic component band. By this means, it is possible to avoid unnecessary padding for uplink assignment control information (format 0).

The embodiment mentioned above explains an example when the present invention is performed by hardware, but the present invention can be implemented with software.

Furthermore, each function block employed in the description of the aforementioned embodiment may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2009-059501, filed on Mar. 12, 2009, including the specification, drawings and abstract, is incorporated herein by reference in its entirety.

INDUSTRIAL APPLICABILITY

A radio terminal, radio base station, channel signal forming method and channel signal reception method of the present invention is useful to reduce the number of times of blind detection in a reception process of assignment control information without causing any problems on receiving broadcast signals.

The invention claimed is:

1. A base station communicating with a user equipment (UE), for which an uplink component carrier and a plurality of downlink component carriers are configured, the base station comprising:
   an adjusting section configured to adjust a payload size of control information, which is transmitted in a downlink control channel, based on a basic payload size; and
   a multiplexing section configured to map the control information onto a search space in at least one of the plurality of downlink component carriers,
   wherein: the plurality of downlink component carriers include a primary downlink component carrier;
   the basic payload size of the control information mapped onto a search space in the primary downlink component carrier is a payload size, which is given based on a number of information bits obtained from a bandwidth of the primary downlink component carrier, and on a number of information bits obtained from a bandwidth of the uplink component carrier, the bandwidth of the uplink component carrier being broadcasted in the primary downlink component carrier; and
   the basic payload size of the control information mapped onto a search space in a downlink component carrier other than the primary downlink component carrier is a payload size, which is given based on a number of information bits obtained from a bandwidth of the downlink component carrier other than the primary downlink component carrier.

2. The base station according to claim 1, wherein the primary downlink component carrier is a downlink component carrier that broadcasts information related to the uplink component carrier configured for the UE.

3. The base station according to claim 1, wherein: the search space is a common search space or a UE specific search space;
the basic payload size of the control information mapped onto the common search space or the UE specific search space in the primary downlink component carrier is a payload size, which is given based on the number of information bits obtained from the bandwidth of the primary downlink component carrier, and on the number of information bits obtained from the bandwidth of the uplink component carrier, the bandwidth of the uplink component carrier being broadcasted in the primary downlink component carrier; and
the basic payload size of the control information mapped onto the UE specific search space in a downlink component carrier other than the primary downlink component carrier is a payload size, which is given based on the number of information bits obtained from the bandwidth of the downlink component carrier other than the primary downlink component carrier.

4. The base station according to claim 1, wherein the basic payload size of the control information mapped onto the search space in the primary downlink component carrier corresponds to a larger one of the number of information bits obtained from the bandwidth of the primary downlink component carrier and the number of information bits obtained from the bandwidth of the uplink component carrier, the bandwidth of the uplink component carrier being broadcasted in the primary downlink component carrier.

5. The base station according to claim 1, wherein the control information includes at least one of downlink assignment information and uplink assignment information;
the basic payload size of the control information mapped onto the search space in the primary downlink component carrier is a payload size, which is given based on a number of information bits in downlink assignment information obtained from the bandwidth of the primary downlink component carrier, and on a number of information bits in uplink assignment information obtained from the bandwidth of the uplink component carrier, the bandwidth of the uplink component carrier being broadcasted in the primary downlink component carrier; and
the basic payload size of the control information mapped onto the search space in a downlink component carrier other than the primary downlink component carrier is a payload size, which is given based on a number of information bits in downlink assignment information obtained from the bandwidth of the downlink component carrier other than the primary downlink component carrier.

6. The base station according to claim 5, wherein the multiplexing section maps the downlink assignment information onto the search space in at least one of the plurality of downlink component carriers, and maps the uplink assignment information onto the search space in the primary downlink component carrier.

7. The base station according to claim 6, wherein the uplink assignment information is not mapped onto the search space in a downlink component carrier other than the primary downlink component carrier.

8. The base station according to claim 5, wherein the adjusting section adjusts the payload size of the downlink assignment information mapped onto the search space in the primary downlink component carrier and the payload size of the uplink assignment information mapped onto the search space in the primary downlink component carrier to be equal to each other.

9. The base station according to claim 5, wherein the adjusting section appends zeros to one of the downlink and uplink assignment information mapped onto the search space in the primary downlink component carrier, which includes the number of information bits that is smaller than the number of information bits included in the other of the downlink and uplink assignment information, until the payload size of said one of the downlink and uplink assignment information becomes equal to the payload size of said other of the downlink and uplink assignment information.

10. The base station according to claim 5, wherein a format of the downlink assignment information is format 1A, and a format of the uplink assignment information is format 0.

11. A method for forming a control channel at a base station communicating with a user equipment (UE), for which an uplink component carrier and a plurality of downlink component carriers are configured, the method comprising:
adjusting a payload size of control information, which is transmitted in a downlink control channel, based on a basic payload size; and
mapping the control information onto a search space in at least one of the plurality of downlink component carriers,
wherein: the plurality of downlink component carriers include a primary downlink component carrier;
the basic payload size of the control information mapped onto a search space in the primary downlink component carrier is a payload size, which is given based on a number of information bits obtained from a bandwidth of the primary downlink component carrier, and on a number of information bits obtained from a bandwidth of the uplink component carrier, the bandwidth of the uplink component carrier being broadcasted in the primary downlink component carrier; and
the basic payload size of the control information mapped onto a search space in a downlink component carrier other than the primary downlink component carrier is a payload size, which is given based on a number of information bits obtained from a bandwidth of the downlink component carrier other than the primary downlink component carrier.

12. The method for forming a control channel according to claim 11, wherein the primary downlink component carrier is a downlink component carrier that broadcasts information related to the uplink component carrier configured for the UE.

13. The method for forming a control channel according to claim 11, wherein: the search space is a common search space or a UE specific search space;
the basic payload size of the control information mapped onto the common search space or the UE specific search space in the primary downlink component carrier is a payload size, which is given based on the number of information bits obtained from the bandwidth of the primary downlink component carrier, and on the number of information bits obtained from the bandwidth of the uplink component carrier, the bandwidth of the uplink component carrier being broadcasted in the primary downlink component carrier; and the basic payload size of the control information mapped onto the UE specific search space in a downlink component carrier other than the primary downlink component carrier is a payload size, which is given based on the number of information bits obtained from the bandwidth of the downlink component carrier other than the primary downlink component carrier.

14. The method for forming a control channel according to claim 11, wherein the basic payload size of the control information mapped onto the search space in the primary downlink component carrier corresponds to a larger one of the number of information bits obtained from the bandwidth of the primary downlink component carrier and the number of information bits obtained from the bandwidth of the uplink component carrier, the bandwidth of the uplink component carrier being broadcasted in the primary downlink component carrier.

15. The method for forming a control channel according to claim 11, wherein the control information includes at least one of downlink assignment information and uplink assignment information;

the basic payload size of the control information mapped onto the search space in the primary downlink component carrier is a payload size, which is given based on a number of information bits in downlink assignment information obtained from the bandwidth of the primary downlink component carrier, and on a number of information bits in uplink assignment information obtained from the bandwidth of the uplink component carrier, the bandwidth of the uplink component carrier being broadcasted in the primary downlink component carrier; and the basic payload size of the control information mapped onto the search space in a downlink component carrier other than the primary downlink component carrier is a payload size, which is given based on a number of information bits in downlink assignment information obtained from the bandwidth of the downlink component carrier other than the primary downlink component carrier.

16. The method for forming a control channel according to claim 15, wherein the mapping of the control information includes mapping the downlink assignment information onto the search space in at least one of the plurality of downlink component carriers, and mapping the uplink assignment information onto the search space in the primary downlink component carrier.

17. The method for forming a control channel according to claim 16, wherein the uplink assignment information is not mapped onto the search space in a downlink component carrier other than the primary downlink component carrier.

18. The method for forming a control channel according to claim 15, wherein the adjusting of the payload size of the control information includes adjusting the payload size of the downlink assignment information mapped onto the search space in the primary downlink component carrier and the payload size of the uplink assignment information mapped onto the search space in the primary downlink component carrier to be equal to each other.

19. The method for forming a control channel according to claim 15, wherein the adjusting of the payload size of the control information includes appending zeros to one of the downlink and uplink assignment information mapped onto the search space in the primary downlink component carrier, which includes the number of information bits that is smaller than the number of information bits included in the other of the downlink and uplink assignment information, until the payload size of said one of the downlink and uplink assignment information becomes equal to the payload size of said other of the downlink and uplink assignment information.

20. The method for forming a control channel according to claim 15, wherein a format of the downlink assignment information is format 1A, and a format of the uplink assignment information is format 0.

* * * * *